(12) United States Patent
Gao

(10) Patent No.: US 8,330,720 B2
(45) Date of Patent: Dec. 11, 2012

(54) OPTICAL NAVIGATION SYSTEM AND METHOD FOR PERFORMING SELF-CALIBRATION ON THE SYSTEM USING A CALIBRATION COVER

(75) Inventor: Jun Gao, Saratoga, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 558 days.

(21) Appl. No.: 12/642,152

(22) Filed: Dec. 18, 2009

(65) Prior Publication Data

US 2011/0148764 A1 Jun. 23, 2011

(51) Int. Cl.
*G06F 3/033* (2006.01)
(52) U.S. Cl. ..................... 345/163; 250/252.1
(58) Field of Classification Search .......... None
See application file for complete search history.

(56) References Cited

U.S. PATENT DOCUMENTS

| | | | |
|---|---|---|---|
| 6,184,514 B1 | 2/2001 | Rezende et al. | |
| 7,166,831 B2 | 1/2007 | Depue et al. | |
| 7,474,297 B2 * | 1/2009 | Moyer et al. | 345/163 |
| 8,022,931 B2 * | 9/2011 | Soo et al. | 345/166 |
| 2004/0246232 A1 | 12/2004 | Chang et al. | |
| 2006/0202962 A1 * | 9/2006 | Lai et al. | 345/166 |
| 2006/0255152 A1 * | 11/2006 | Xie et al. | 235/472.01 |
| 2010/0039381 A1 * | 2/2010 | Cretella et al. | 345/158 |

OTHER PUBLICATIONS

"Industrial Keyboards—Waterproof Keyboards for computers, mainly metal construction, also rubber keyboards," website at www.esis.com.au/Adv3Acc/Adv3Acc_Keyb_Industrial.htm, accessed on Jul. 3, 2009.

* cited by examiner

*Primary Examiner* — Van Chow

(57) ABSTRACT

An optical navigation system and method for performing self-calibration on the system uses captured frames of image data of an interior surface of a calibration cover of the system to detect a performance-related change of the system. In response to the detected performance-related change, a predefined procedure is then initiated.

20 Claims, 6 Drawing Sheets

OPTICAL NAVIGATION SYSTEM AND METHOD FOR PERFORMING SELF-CALIBRATION ON THE SYSTEM USING A CALIBRATION COVER

BACKGROUND OF THE INVENTION

Optical navigation systems operate to estimate movements between the optical navigation systems and navigation surfaces to perform tracking operations. An optical navigation system uses a light source, such as a light-emitting diode (LED) or a laser diode, to illuminate a region of a navigation surface and an image sensor array to receive the light reflected from the navigation surface to successively capture frames of image data of the navigation surface. The optical navigation system compares the successive image frames and estimates the relative movements between the optical navigation system and the navigation surface based on the comparisons between the successive image frames. The comparisons are based on detecting and computing displacements of features in the captured frames of image data, which involve performing cross-correlations on the frames of image data.

Optical navigation systems are commonly used in optical computer mice to track the movements of the mice relative to the navigation surfaces on which the mice are manually manipulated. The movements of a computer mouse are used to control a cursor on a monitor of a computer system.

Performance of a computer mouse over time can degrade due to various factors during the life of the computer mouse. As an example, contamination on optics and other components of a computer mouse can produce fixed pattern noise in captured image frames, which may adversely affect cross-correlation results. As another example, the illumination provided by the light source of a computer mouse may deteriorate over time, which can degrade the quality of image frames that are captured for cross-correlation.

Thus, there is a need for a system and method for performing calibrations on an optical navigation device, such as an optical computer mouse, to correct performance-degrading changes.

SUMMARY OF THE INVENTION

An optical navigation system and method for performing self-calibration on the system uses captured frames of image data of an interior surface of a calibration cover of the system to detect a performance-related change of the system. In response to the detected performance-related change, a predefined procedure is then initiated.

An optical navigation system in accordance with an embodiment of the invention comprises a housing, a calibration cover, an image sensor and a self-calibration module. The housing includes an aperture. The calibration cover has an interior surface and is configured to be positioned to cover the aperture of the housing. In an embodiment, the interior surface of the calibration cover is at least partially coated with white aluminum composite signage material. The image sensor has an array of photosensitive elements configured to capture frames of image data of the interior surface of the calibration cover when the interior surface of the calibration cover is positioned in the field of view of the image sensor and to capture frames of image data of a navigation surface when the calibration cover is not positioned in the field of view of the image sensor. The self-calibration module is operably connected to the image sensor. The self-calibration module is configured to detect a performance-related change of the system using the frames of image data of the interior surface of the calibration cover. The self-calibration module is further configured to initiate a predefined procedure in response to the performance-related change of the system.

A method for performing self-calibrating on an optical navigation system in accordance with an embodiment of the invention comprises capturing frames of image data of an interior surface of a calibration cover of the system, the calibration cover being configured to be positioned to cover an aperture of a housing of the system, detecting a performance-related change of the system using the frames of image data of the interior surface of the calibration cover, and initiating a predefined procedure in response to the performance-related change of the system.

Other aspects and advantages of the present invention will become apparent from the following detailed description, taken in conjunction with the accompanying drawings, illustrated by way of example of the principles of the invention.

DETAILED DESCRIPTION

Figure 1:
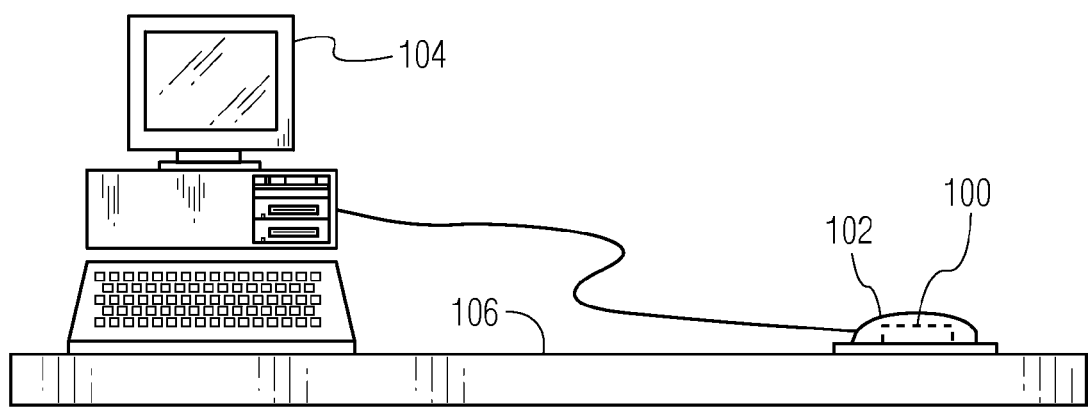
FIG. 1 shows an optical navigation system included in an optical computer mouse in accordance with an embodiment of the invention.

With reference to FIG. 1, an optical navigation system 100 in accordance with an embodiment of the invention is shown. As shown in FIG. 1, the optical navigation system 100 is included in an optical computer mouse 102, which is connected to a computer 104. In this implementation, the optical navigation system 100 is used to track the movements of the optical mouse 102 as the optical mouse is manipulated over a navigation surface 106, which can be any type of suitable surface, by a user to control a cursor displayed on the computer 104. However, in other implementations, the optical navigation system 100 can be used in different products for various tracking applications. As described in detail below, the optical navigation system 100 is configured to perform self-calibration using a known surface to detect performance degradation, which may be due to contamination on various components of the system and/or operational deviation of one or more components of the system. Once performance degradiations or changes are detected, the optical navigation system 100 may compensate for the performance degradation and/or alert the user of the performance degradation, which may also involve making the optical navigation system non-operational.

Figure 2:
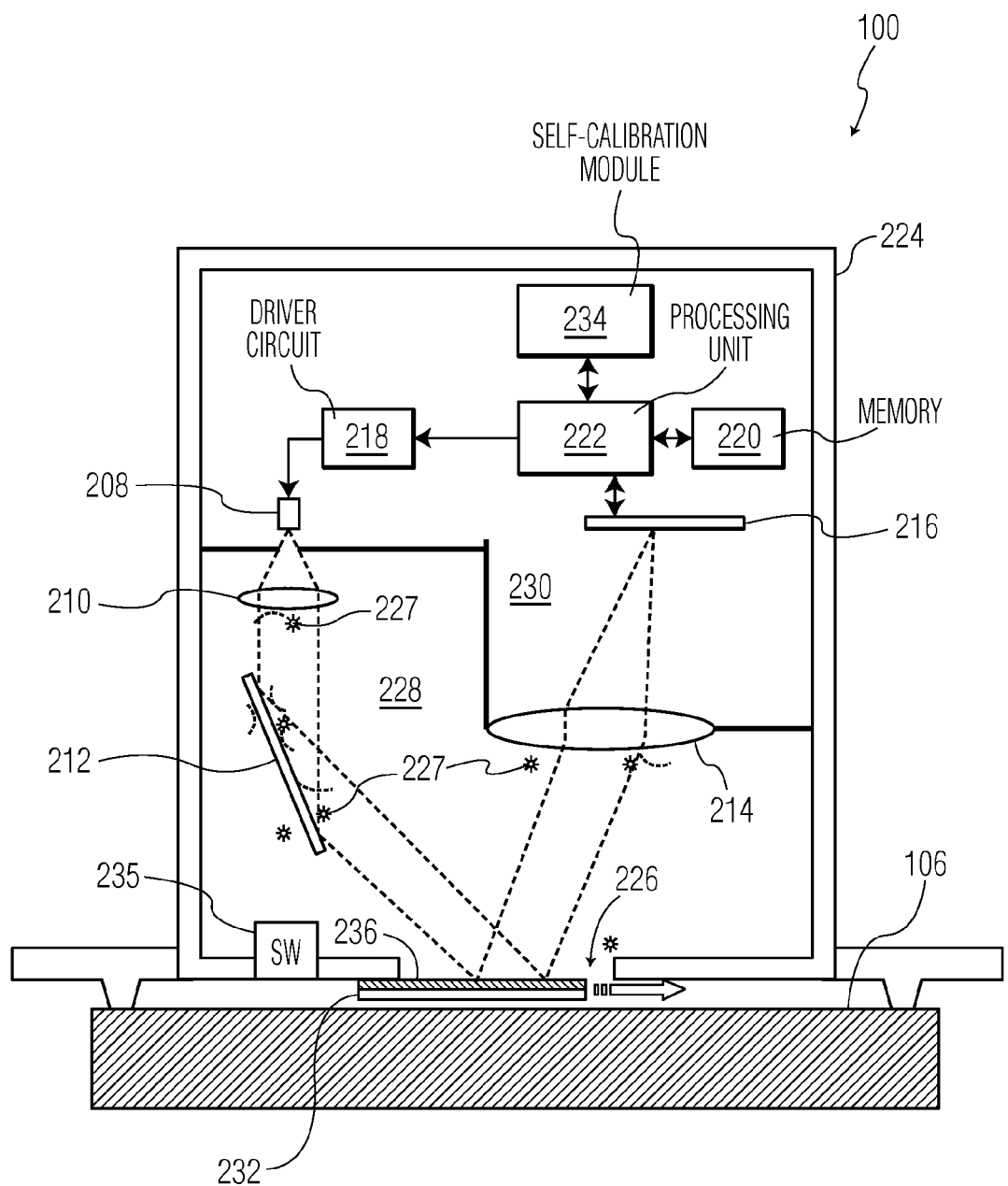
FIG. 2 is a diagram of the optical navigation system in accordance with an embodiment of the invention.

As shown in FIG. 2, the optical navigation system 100 includes a light source 208, an illumination lens 210, a reflective element 212, an imaging lens 214, an image sensor 216, a driver circuit 218, memory 220 and a processing unit 222. Although these components of the optical navigation system 100 are shown in FIG. 2 as being separate components, some of these components may be integrated. As an example, the image sensor 216, the driver circuit 218, the memory 220 and the processing unit 222 may be integrated into a single integrated circuit chip. In addition, the illumination lens 210, the reflective element 212 and the imaging lens 214 may be integrated into a single-unit optical element.

The light source 208 is configured to generate light in response to an applied driving signal. The light source 208 can be any type of a light emitting device, such as a light-emitting diode or a laser diode. As an example, the light source 208 may be a vertical-cavity surface-emitting laser (VCSEL), which generates a coherent laser beam of light. The light source 208 is activated by the driver circuit 218, which provides driving signals to the light source. The illumination lens 210 and the reflective element 212 are positioned between the light source 208 and the navigation surface 106 to direct the light from the light source onto a region of the navigation surface at a desired angle. In some embodiments, the illumination lens 208 may focus and/or collimate the light from the light source 208, which is then reflected so that the light is incident on the navigation surface 106 at the desired angle. In other embodiments of the optical navigation system 100, the focusing lens 210 and/or the reflective element 212 may be omitted. The imaging lens 214 is positioned between the navigation surface 106 and the image sensor 216 to focus the light reflected off the navigation surface onto the image sensor.

The image sensor 216 is configured to capture frames of image data of the navigation surface 106 for displacement estimation. The image sensor 216 includes an array of photosensitive pixel elements (not shown). Each photosensitive pixel element is configured to accumulate an electrical charge in response to incident light. During an exposure period, the photosensitive pixel elements simultaneously accumulate electrical charges in response to light from the navigation surface 106, which are captured as electrical signals at the end of the exposure period. These signals form a frame of image data of the navigation surface 106, which can then be used to estimate any displacement between the optical navigation system 100 and the navigation surface. Both the exposure period of the photosensitive pixel elements and the light source driver circuit 218 can be controlled by an electronic shutter, which is regulated by the electronic signal strength accumulated on the image sensor 216.

The image sensor 216 may be a charged-coupled device (CCD) image sensor, a complementary metal oxide semiconductor (CMOS) image sensor, or any device that is capable of producing an image. The number of photosensitive pixel elements included in the image sensor 216 may vary depending on at least the particular application of the optical navigation system 100. As an example, the image sensor 216 may include a 20×20 array of photosensitive pixel elements. Thus, in this example, the image sensor includes a 20×20 array of active photosensitive pixel elements. Active photosensitive pixel elements are the pixel elements that are used to capture the electrical signals that form a frame of image data. Consequently, in this example, each frame of image data captured by the image sensor 216 is a 20×20 pixel frame of image data. The frames of image data captured by the image sensor 216 may be stored in the memory 220 to be used by the processing unit 222.

The memory 220 can be any type of read/writable memory, such as random access memory. Although the memory 220 is shown in FIG. 2 to be external to the processing unit 222, the memory 220 may be located within the processing unit in other embodiments.

The processing unit 222 is configured to control the driver circuit 218 and the image sensor 216 in order to capture frames of image data of the navigation surface 106. The processing unit 222 is electrically connected to the driver circuit 218 and the image sensor 216 to provide control signals. The processing unit 222 provides control signals to the driver circuit 218 to direct the driver circuit to apply driving signals to the light source 208 to activate the light source. The processing unit 222 also provides control signals to the image sensor 216 to accumulate electrical charges at the photosensitive pixel elements of the image sensor and integrate at least some of the photosensitive pixel elements to produce each frame of image data of the navigation surface 106. Thus, the processing unit 222 is able to control the frame rate of the optical navigation system 100.

The processing unit 222 is also configured to process the captured frames of image data of the navigation surface 106 to estimate any displacement between the optical navigation system 100 and the navigation surface. The process of determining displacements between the optical navigation system 100 and the navigation surface 106 involves correlating a frame of image data of the navigation surface with a subsequently captured frame of image data of the navigation surface. Thus, the processing unit 222 is configured to perform cross-correlation on the captured frames of image data. The output of the processing unit 222 includes directional delta X displacement values, Delta_X, and directional delta Y displacement values, Delta_Y. Each directional displacement value includes a negative or positive sign information, which indicates direction, and an absolute displacement value, which indicates the amount of displacement in that direction. In a particular implementation, the directional delta X and Y displacement values are generated in the form of two's complement binary numbers.

The processing unit 222 may be a general-purpose digital processor such as a microprocessor or microcontroller. In other embodiments, the processing unit 222 may be a special-purpose processor such as a digital signal processor. In still other embodiments, the processing unit 222 may be another type of controller or a field programmable gate array (FPGA).

As shown in FIG. 2, the light source 208, the illumination lens 210, the reflective element 212, the imaging lens 214, the image sensor 216, the driver circuit 218, the memory 220 and the processing unit 222 of the optical navigation system 100 are positioned within a housing 224, which includes an aperture 226. The aperture 226 of the housing 224 is needed for the illumination light from the light source 208 to reach the navigation surface 106 and for the light reflected from the navigation surface to reach the image sensor 216 during normal tracking operation. However, the aperture 226 also allows contaminating particles 227, such as dust, dirt and fibers, to enter into the housing 224, which can then land on some of the components of the optical navigation system 100. As illustrated in FIG. 2, the interior region of the housing 224 can be viewed as including a contaminated area 228, which is exposed to contaminants that enter through the aperture 226, and a contamination-free area 230, which is not exposed to the contaminants. In the illustrated embodiment, the illumination lens 210, the reflective element 212 and the imaging lens 214 are situated in the contaminated area 228 of the housing 224. Thus, these components are exposed to the contaminating particles 227, such as dust, dirt and fibers, landing on them, which would result in fixed pattern noise in the frames of image data that are captured for optical tracking. Thus, the performance of the optical navigation system 100 can deteriorate due to these contaminating particles 227 on the exposed components of the system.

In addition, over time, other components of the optical navigation system 100 would gradually shift from their nominal and factory preset values. As an example, the illumination power of the light source 208 can change over time and the illumination profile of the image sensor 216 can shift over time. These changes will make displacement sensing and estimation less accurate, and therefore, degrade the performance of the optical navigation system 100. The performance degradation due to operational changes of the components of the optical navigation system 100 and/or due to contamination on the components of the system can even render the system useless.

The optical navigation system 100 is design to perform self-calibration to detect performance degradation, or in general, performance-related changes, due to contamination and/or operational changes of components of the system, and to compensate for the performance-related changes and/or notify the user of the detected performance-related changes. In order to perform self-calibration, the optical navigation system 100 further includes a calibration cover 232 and a self-calibration module 234 that uses the calibration cover for self-calibration.

The calibration cover 232 is coupled to the housing 224 such that the aperture 226 of the housing can be covered by the calibration cover. In an embodiment, the calibration cover 232 is coupled to the housing 224 such that the calibration cover can slide across the aperture 226 to cover the aperture. One of the purposes of the calibration cover 232 is to prevent contaminating particles, such as dust, dirt, hairs and other fibers, from entering into the housing 224 and getting to the exposed components in the housing to minimize particle contamination. The calibration cover 232 can also double as a system on/off switch to preserve battery life while the optical navigation system 100 is not in use. For this purpose, a switch 235 is used to trigger the optical navigation system 100 to shut down when the calibration cover 232 is closed and to trigger the optical navigation system to turn back on when the calibration cover is opened. In an embodiment, the switch 235 is connected to the processing unit 222, which turns on and off the optical navigation system 100 in response to signals from the switch.

Figure 3A:
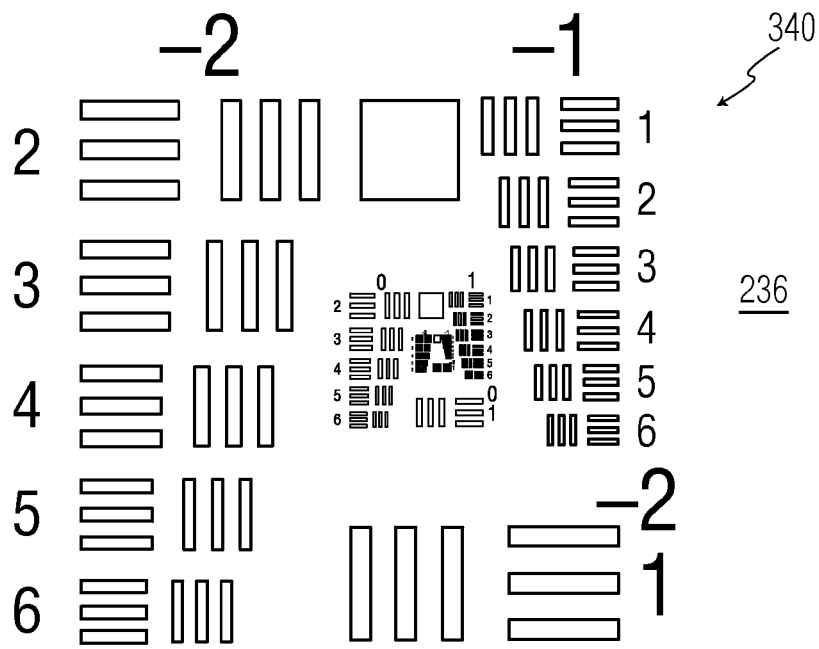
FIG. 3A illustrates an Air Force 1951 calibration test pattern on an interior surface of a calibration cover of the system of FIG. 2 in accordance with an embodiment of the invention.
Figure 3B:
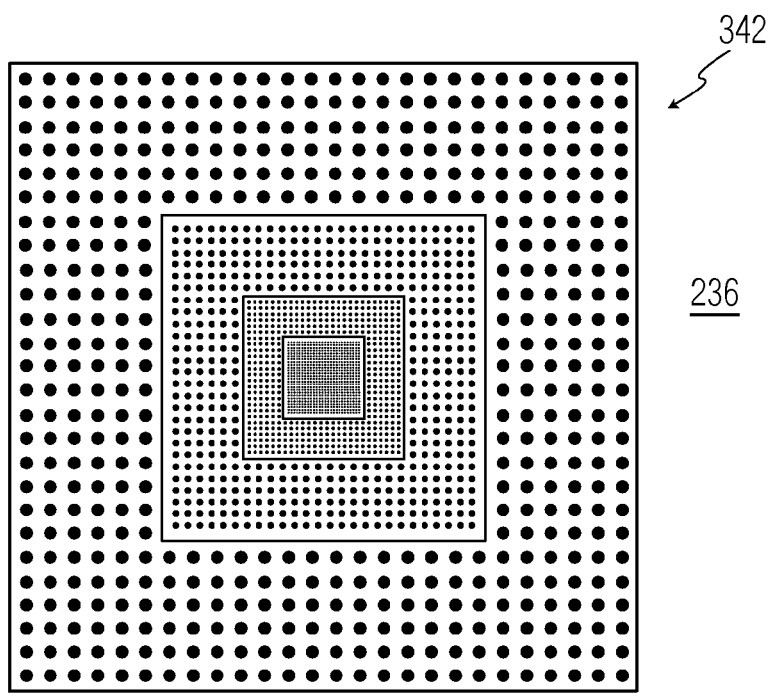
FIG. 3B illustrates a dot array calibration target pattern on the interior surface of the calibration cover of the system of FIG. 2 in accordance with another embodiment of the invention.
Figure 3C:
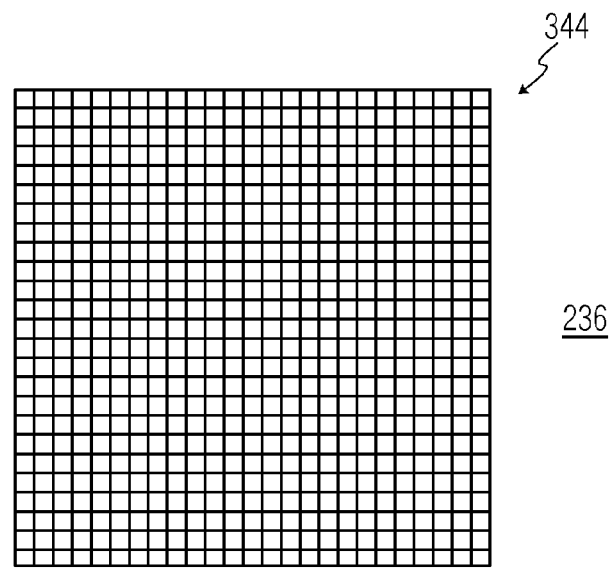
FIG. 3C illustrates a line grid pattern on the interior surface of the calibration cover of the system of FIG. 2 in accordance with another embodiment of the invention.
Figure 3D:
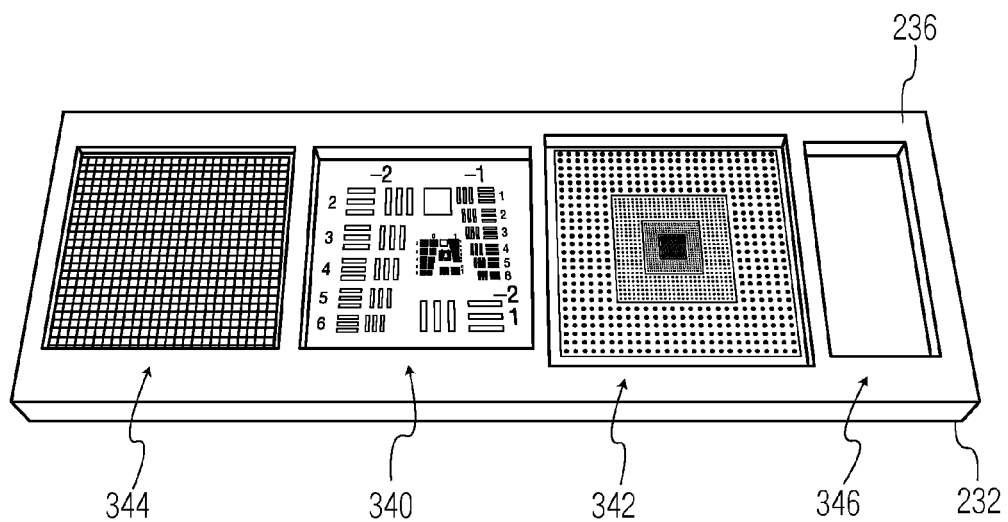
FIG. 3D illustrates the Air Force 1951 calibration test pattern, the dot array calibration target pattern, the line grid pattern and a white aluminum composite signage material region on the interior surface of the calibration cover of the system of FIG. 2 in accordance with another embodiment of the invention.

Another purpose of the calibration cover 232 is to provide a known navigation surface for self-calibration of the optical navigation system 100. For this purpose, an interior surface 236 of the calibration cover 232 that faces the image sensor 216 serves as the known navigation surface. In an embodiment, the interior surface 236 of the calibration cover 232 is coated with a known material so that optical properties of the interior surface are known with respect to optical tracking. As an example, the interior surface 236 of the calibration cover 232 may be coated with white aluminum composite signage material, such as white Dibond (commonly used for signs), which has good optical properties for optical tracking. In other embodiments, the interior surface 236 of the calibration cover 232 includes natural or manmade marks, which are known so that the interior surface can be used for calibration. As an example, the interior surface 236 of the calibration cover 232 may include an Air Force 1951 calibration test pattern 340, as illustrated in FIG. 3A. As another example, the interior surface 236 of the calibration cover 232 may include a dot array calibration target pattern 342, which includes rows and columns of different sized dots, as illustrated in FIG. 3B. As another example, the interior surface 236 of the calibration cover 232 may include a line grid pattern 344, as illustrated in FIG. 3C. As another example, the interior surface 236 of the calibration cover 232 may include a number of known patterns or regions, such as the Air Force 1951 calibration test pattern 340, the dot array calibration target pattern 342, the line grid pattern 344 and a white aluminum composite signage material region 346, which may be a region of white Dibond, as illustrated in FIG. 3D.

The self-calibration module 234 is configured to perform self-calibration to detect performance degradation of the optical navigation system 100 due to contamination and/or operational changes of components of the system. The self-calibration is performed using frames of image data of the interior surface 236 of the calibration cover 232, which can be acquired as the calibration cover is closing when the interior surface comes into the field of view of the image sensor 216. In this manner, hundreds or even thousands of frames of image data of the interior surface 236 of the calibration cover 232 can be acquired for self-calibration. Thus, the image sensor 216 can capture frames of image data of the interior surface 236 of the calibration cover 232 when the interior surface is in the field of view of the image sensor, as the calibration cover is being closed or after the calibration cover has closed. However, when the calibration cover 232 is open, i.e., when the interior surface 236 of the calibration cover 232 is not in the field of view of the image sensor 216, the image sensor 216 can capture frames of image data of the navigation surface for normal tracking operation.

In an embodiment, the self-calibration module 234 is configured to suppress transient features on the interior surface 236 of the calibration cover 232, as well as any transient noise sources, in the captured frames of image data of the interior surface, leaving only the fixed pattern noise in the captured frames of image data that is most likely due to the contaminating particles 227 on some of the components of the optical navigation system 100, such as surfaces of the illumination lens 210, the reflective element 212 and the imaging lens 214. This is achieved by acquiring images only when the cover 232 is moving to close or open the aperture 226. The severity of the particle contamination on the components of the optical navigation system 100 can be evaluated by comparing the fixed pattern noise in the captured frames of image data with the fixed pattern noise measurements calibrated during the manufacturing process. If the self-calibration module 234 determines that significant fixed pattern noise due to contamination exists in the captured frames of image data, the self-calibration module may compensate for the fixed pattern noise using image processing, such as filtering and/or fixed pattern noise correcting algorithm.

In another embodiment, the self-calibration module 234 is configured examine the captured frames of image data of the interior surface 236 of the calibration cover 232 to determine the current energy emitted from the light source 208, which is then compared to the factory default value. As an example, the self-calibration module 234 may calculate the average intensity values of pixels in the captured frames of image data of the interior surface 236 of the calibration cover 232, using a predefined exposure period, to determine the current energy emitted from the light source 208. Thus, the light emitting power variation of the light source 208 over time can be measured using the captured frames of image data of the interior surface 236 of the calibration cover 232. If the self-calibration module 234 determines that the light emitting power of the light source 208 has significantly changed, the self-calibration module may compensate for the light emitting power variation by changing the drive current to the light source, which is an operating parameter of the optical navigation system 100.

In another embodiment, the self-calibration module 234 is configured to determine optical characteristics of the optical navigation system 100 with respect to an image capturing operation, such as point spread function and optical stop, using the interior surface 236 of the calibration cover 232 that includes one or more designed patterns and one or more known surfaces, such as white Dibond and/or glass. As an example, the interior surface 236 of the calibration cover 232 may have a configuration illustrated in FIG. 3D. The determined optical characteristics are evaluated by the self-calibration module 234 for changes, which can then be at least partially compensated if the optical characteristics are not within specification.

In another embodiment, the self-calibration module 234 is configured to determine the accuracy of the optical navigation system 100. In this embodiment, the self-calibration module 234 compares displacement measurements derived using the interior surface 236 of the calibration cover 232 with known distances on the interior surface. Using this comparison, the self-calibration module 234 can calibrate the displacement calculations performed by the optical navigation system 100 throughout the life of the optical navigation system.

In general, the self-calibration module 234 can measure any characteristic and performance issues of the optical navigation system 100, which are expected to change over time and usage, using captured frames of image data of the interior surface 236 of the calibration cover 232 since optical features of the interior surface are known. The self-calibration module 234 can then calibrate or compensate for the characteristic and performance measurements by, for example, initiating an image-correcting algorithm and/or changing one or more operating parameters of active components of the optical navigation system 100. In addition, the self-calibration module 234 may notify the user of the measured characteristic and performance issues. In extreme cases, the self-calibration module 234 may disable the optical navigation system 100, i.e., make the system non-operational.

In the illustrated embodiment, the self-calibration module 234 is a separate component with respect to the processing unit 222. However, in other embodiments, the self-calibration module 234 may be integrated into the processing unit 222. The self-calibration module 234 can be implemented as software, hardware, firmware or any combination thereof.

Figure 4:
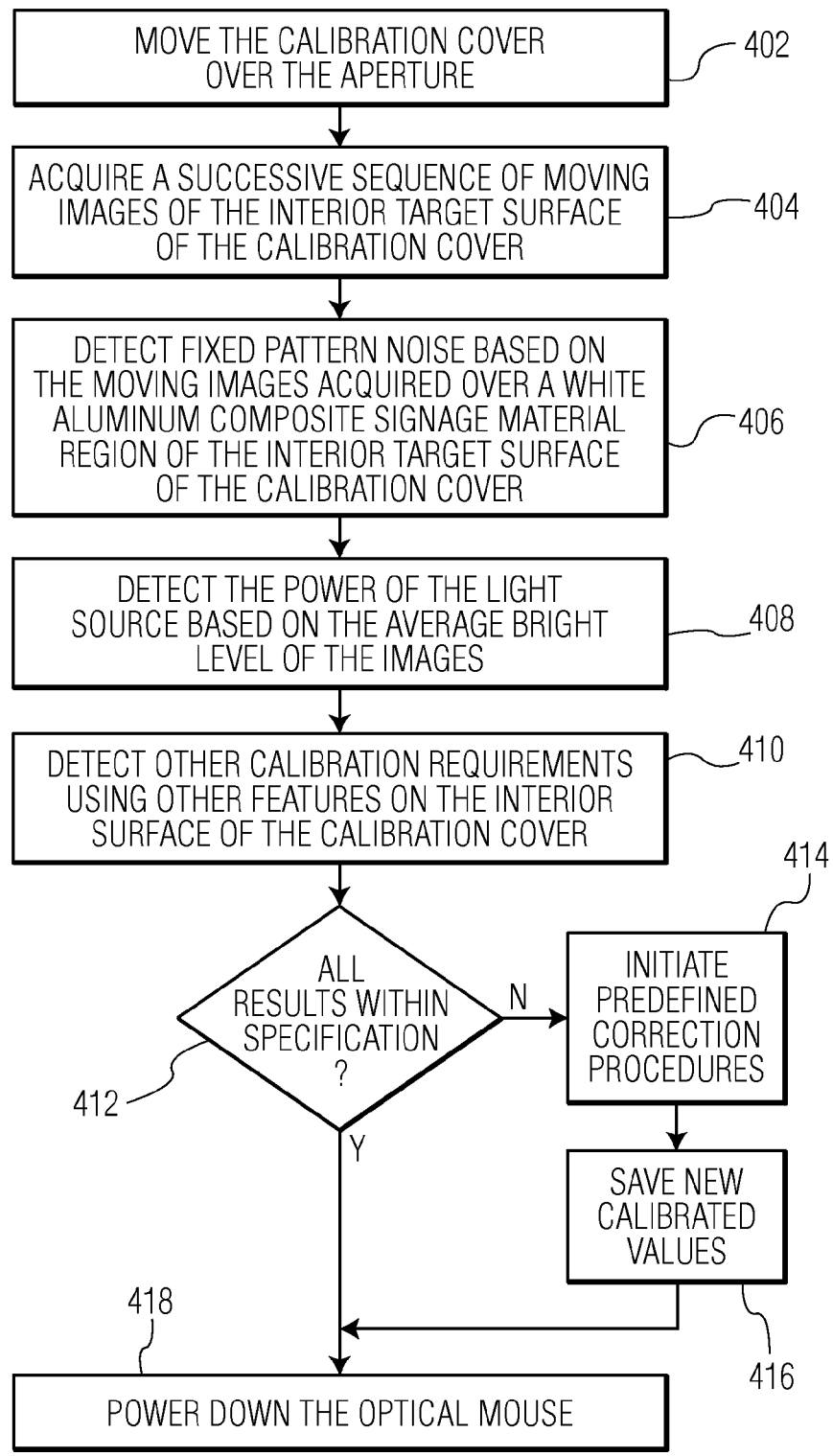
FIG. 4 is a process flow diagram of a self-calibration operation of the optical navigation system of the optical mouse in accordance with an embodiment of the invention.

A self-calibration operation of the optical navigation system 100 of the optical mouse 102 in accordance with an embodiment of the invention is now described with reference to a process flow diagram of FIG. 4. At step 402, the calibration cover 232 is moved over the aperture 226. Next, at step 404, a successive sequence of moving images, i.e., frames of image data, are acquired of the interior target surface 236 of the calibration cover 232 as the calibration cover is being moved. Next, at step 406, fixed pattern noise is detected based on the moving images acquired over a white aluminum composite signage material region, e.g., the white Dibond region 346, of the interior target surface 236 of the calibration cover 232. Next, at step 408, the power of the light source 208 is detected based on the average bright level of the acquired images. Next, at step 410, other calibration requirements are detected using other features on the interior target surface 236 of the calibration cover 232 that are captured in the acquired images. In other embodiments, the order of steps 408-410 may vary. Furthermore, in other embodiments, one or more of the steps 406-410 may be omitted.

Next, at step 412, a determination is made whether all the detected results are within specifications. If the detected results are within specifications, then the operation proceeds to step 418, where the optical mouse 102 is powered down. However, if the detected results are not within specifications, then the operation proceeds to step 414, where one or more predefined correction procedures are initiated. Next, at step 416, new calibrated values are saved. The operation then proceeds to step 418 to power down the optical mouse 102.

Figure 5:
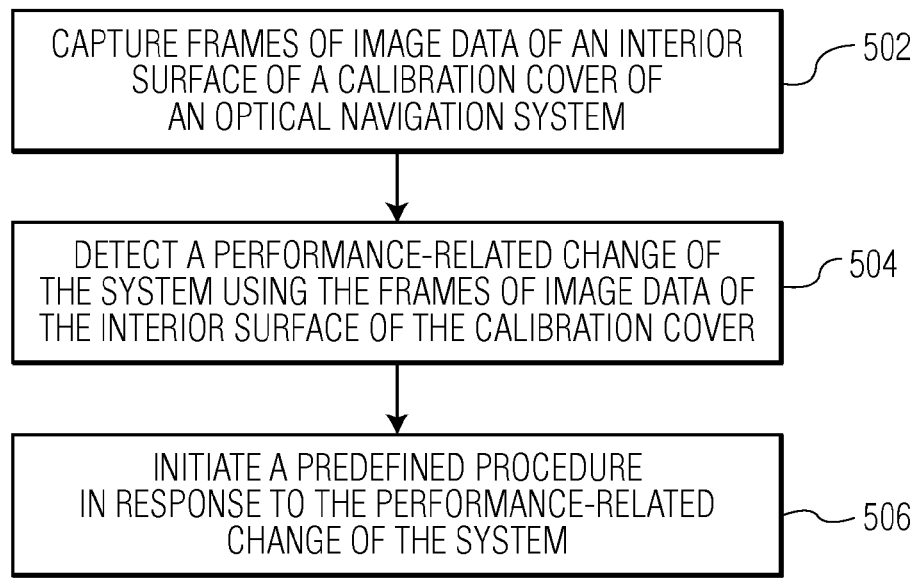
FIG. 5 is a process flow diagram of a method for performing self-calibration on an optical navigation system in accordance with an embodiment of the invention.

A general method for performing self-calibration on an optical navigation system in accordance with an embodiment of the invention is described with reference to a flow diagram of FIG. 5. At block 502, frames of image data of an interior surface of a calibration cover of the system are captured. At block 504, a performance-related change of the system is detected using the frames of image data of the interior surface of the calibration cover system. At block 506, a predefined procedure is initiated in response to the performance-related change of the system Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation system comprising:
   a housing including an aperture;
   a calibration cover having an interior surface, the calibration cover being configured to be positioned to cover the aperture of the housing;
   an image sensor having an array of photosensitive elements configured to capture frames of image data of the interior surface of the calibration cover when the interior surface of the calibration cover is positioned in the field of view of the image sensor and to capture frames of image data of a navigation surface when the calibration cover is not positioned in the field of view of the image sensor; and
   a self-calibration module operably connected to the image sensor, the self-calibration module being configured to detect a performance-related change of the system using the frames of image data of the interior surface of the calibration cover, the self-calibration module being further configured to initiate a predefined procedure in response to the performance-related change of the system.

2. The system of claim 1 wherein the self-calibration module is configured to detect fixed pattern noise in the frames of image data of the interior surface of the calibration cover that is attributable to contaminating particles on some of the components of the system.

3. The system of claim 1 wherein the self-calibration module is configured to determine the light emitting power of a light source of the system using the frames of image data of the interior surface of the calibration cover.

4. The system of claim 1 wherein the self-calibration module is configured to determine optical characteristics of the system with respect to an image capturing operation of the system using the frames of image data of the interior surface.

5. The system of claim 1 wherein the self-calibration module is configured to compare displacement measurements derived using the frames of image data of the interior surface of the calibration cover with known distances on the interior surface to determine the accuracy of the system.

6. The system of claim 1 wherein the predefined procedure includes changing at least one operating parameter of the system.

7. The system of claim 1 wherein the predefined procedure includes notifying a user of the performance-related change of the system.

8. The system of claim 1 wherein the interior surface of the calibration cover is at least partially coated with white aluminum composite signage material.

9. The system of claim 1 wherein the interior surface of the calibration cover includes at least one of an Air Force 1951 calibration test pattern, a dot array calibration target pattern and a line grid pattern.

10. A method for performing self-calibrating on an optical navigation system, comprising:
    capturing frames of image data of an interior surface of a calibration cover of the system, the calibration cover being configured to be positioned to cover an aperture of a housing of the system;
    detecting a performance-related change of the system using the frames of image data of the interior surface of the calibration cover; and
    initiating a predefined procedure in response to the performance-related change of the system.

11. The method of claim 10 wherein the detecting includes analyzing the frames of image data of the interior surface of the calibration cover to detect fixed pattern noise in the frames of image data that is attributable to contaminating particles on some of the components of the system.

12. The method of claim 10 wherein the detecting includes analyzing the frames of image data of the interior surface of the calibration cover to determine the light emitting power of a light source of the system.

13. The method of claim 10 wherein the detecting includes analyzing the frames of image data of the interior surface of the calibration cover to determine optical characteristics of the system with respect to an image capturing operation of the system.

14. The method of claim 10 wherein the detecting includes comparing displacement measurements derived using the frames of image data of the interior surface of the calibration cover with known distances on the interior surface to determine the accuracy of the system.

15. The method of claim 10 wherein the initiating the predefined procedure includes changing at least one operating parameter of the system.

16. The method of claim 10 wherein the initiating the predefined procedure includes notifying a user of the performance-related change of the optical navigation system.

17. The method of claim 10 wherein the interior surface is at least partially coated with white aluminum composite signage material.

18. The method of claim 10 wherein the interior surface includes at least one of an Air Force 1951 calibration test pattern, a dot array calibration target pattern and a line grid pattern.

19. An optical navigation system comprising:
    a housing including an aperture;
    a calibration cover having an interior surface, the calibration cover being positioned to cover the aperture of the housing, the interior surface of the calibration cover being at least partially coated with white aluminum composite signage material;
    an image sensor having an array of photosensitive elements configured to capture frames of image data of the interior surface of the calibration cover when the interior surface of the calibration cover is positioned in the field of view of the image sensor and to capture frames of image data of a navigation surface when the calibration cover is not positioned in the field of view of the image sensor; and
    a self-calibration module operably connected to the image sensor, the self-calibration module being configured to detect a performance-related change of the system using the frames of image data of the interior surface of the calibration cover, the self-calibration module being further configured to initiate a predefined procedure in response to the performance-related change of the system.

20. The system of claim 19 wherein the interior surface of the calibration cover further includes at least one of an Air Force 1951 calibration test pattern, a dot array calibration target pattern and a line grid pattern.

* * * * *